United States Patent [19]

Kaulig et al.

[11] Patent Number: 4,800,725
[45] Date of Patent: Jan. 31, 1989

[54] VEHICLE MASTER BRAKE CYLINDER ASSEMBLY BLEEDING DEVICE

[75] Inventors: Robert Kaulig, Naperville; James D. Wheeler, Crystal Lake, both of Ill.

[73] Assignee: Echlin Inc., Branford, Conn.

[21] Appl. No.: 87,661

[22] Filed: Aug. 20, 1987

[51] Int. Cl.$^4$ ............................ B60T 11/30; F15B 7/10
[52] U.S. Cl. ....................................... 60/584; 188/352; 141/369
[58] Field of Search ................... 60/584, 533; 188/352; 92/79; 141/7, 65, 98, 369

[56] References Cited

U.S. PATENT DOCUMENTS

| | | | |
|---|---|---|---|
| 1,617,020 | 2/1927 | Merwin | 60/584 X |
| 2,241,188 | 5/1941 | Dick | 188/352 X |
| 2,830,859 | 4/1958 | Parsons | 92/79 X |
| 3,583,160 | 6/1971 | Nakamura | 60/584 |
| 4,093,184 | 6/1978 | Wieschel | 60/584 X |
| 4,236,549 | 12/1980 | Salzmann | 60/584 X |

FOREIGN PATENT DOCUMENTS 817333 3/1981 U.S.S.R. ................................ 92/79

*Primary Examiner*—Robert E. Garrett
*Assistant Examiner*—George Kapsalas
*Attorney, Agent, or Firm*—Neuman, Williams, Anderson & Olson

[57] ABSTRACT

A device is provided for bleeding entrapped gas from a master brake cylinder assembly when the latter is removed from a vehicle or prior to the assembly being installed in the vehicle and all of the outlet ports of the assembly are plugged. The device includes a support member having an upright section with a transversely extending passage formed therein. Removably mounted on one side of the upright section is the master cylinder assembly. The assembly is positioned so that an access opening which is formed in one end of the cylinder assembly to provide access to an end portion of a primary piston of the assembly, is aligned with and is adjacent to the passage in the upright section. Disposed in spaced relation to the opposite, or second, side of the upright section is an actuating unit which is mounted on the support member for selective manual adjustment between operative and inoperative modes. The actuating unit is provided with a push member wherein a portion thereof is aligned with and extends through the upright section passage and the cylinder assembly access opening and pushes against the primary piston when the unit is adjusted to an operative mode. As the primary piston is being pushed any gas entrapped within the cylinder assembly ahead of a head of the piston, is bled or purged into a brake fluid reservoir which is in communication with the cylinder assembly.

7 Claims, 2 Drawing Sheets 4,800,725

VEHICLE MASTER BRAKE CYLINDER ASSEMBLY BLEEDING DEVICE

BACKGROUND OF THE INVENTION

In order for the braking system of a vehicle to operate in an effective and safe manner, it is important that the master brake cylinder assembly be purged of any gas which might have become entrapped therein. Various devices have heretofore been utilized in an effort to effect such purging or bleeding of the gas; however, because of certain inherent design characteristics they have been beset with one or more of the following shortcomings: (a) they were of complex, bulky and costly construction; (b) they were difficult and awkward to operate; (c) they were unreliable in properly performing the required purging operation; and (d) they required an inordinate amount of servicing.

SUMMARY OF THE INVENTION

Thus, it is an object of the invention to provide an improved device for bleeding a vehicle master brake cylinder assembly which avoids all of the aforementioned shortcomings.

It is a further object to provide an improved device of the type described which is capable of accommodating master cylinder assemblies and the like which vary in size and shape over a wide range.

It is a further object to provide an improved device of the type described which performs the purging operation in an expeditious and facile manner.

Further and additional objects will appear from the description, accompanying drawings and appended claims.

In accordance with one embodiment of the invention a device is provided for use in bleeding or purging entrapped gas from the master brake cylinder assembly of a vehicle when such assembly is not installed in the vehicle. The device includes a support member having an upright section provided with a transversely extending passage. Removably mounted on one side of the upright section is the cylinder assembly with the outlet ports thereof plugged. The assembly is positioned on the upright section so that an access opening, formed in the end of the cylinder assembly to provide access to an end portion of the primary piston disposed within the assembly, is aligned with and adjacent to the upright section passage. Disposed on the opposite side of the upright section and in spaced relation therewith is an actuating unit which is mounted for manual adjustment between operative and inoperative modes. The unit includes an elongated push member wherein a portion thereof is aligned with and extends through the upright section passage and the cylinder assembly access opening and pushes against the primary piston when the unit is adjusted to the operative mode. As the primary piston is being pushed, any gas entrapped within the cylinder assembly ahead of the piston head is bled into a brake fluid reservoir which is in communication with the cylinder assembly.

DESCRIPTION

For a more complete understanding of the invention, reference is made to the drawings wherein.

Figure 1:
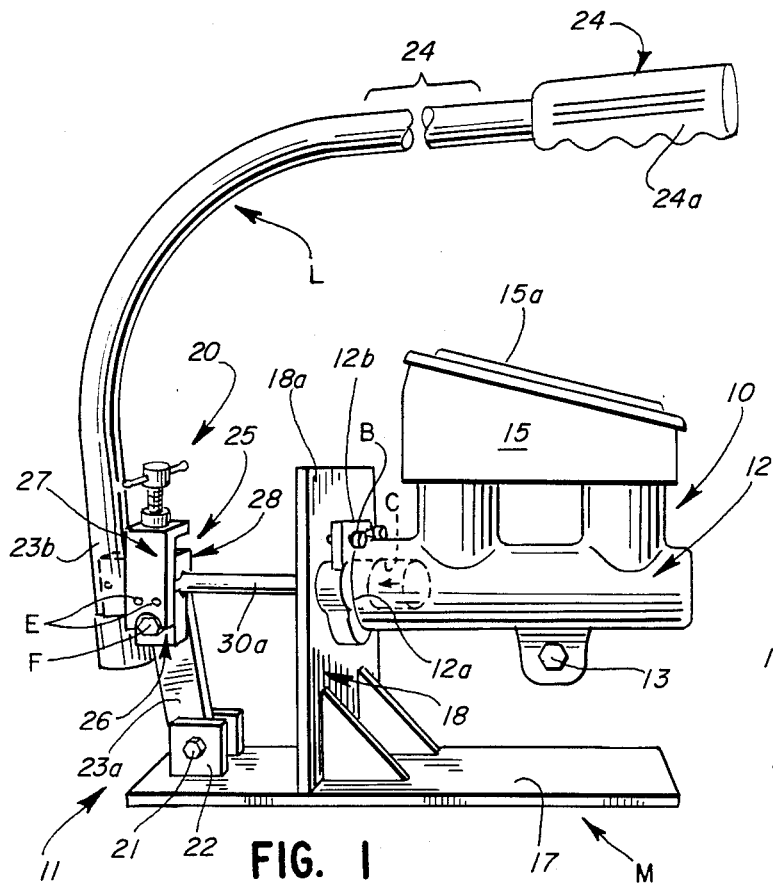
FIG. 1 is a fragmentary side perspective view of one embodiment of the improved device and showing a master brake cylinder assembly mounted thereon.
Figure 2:
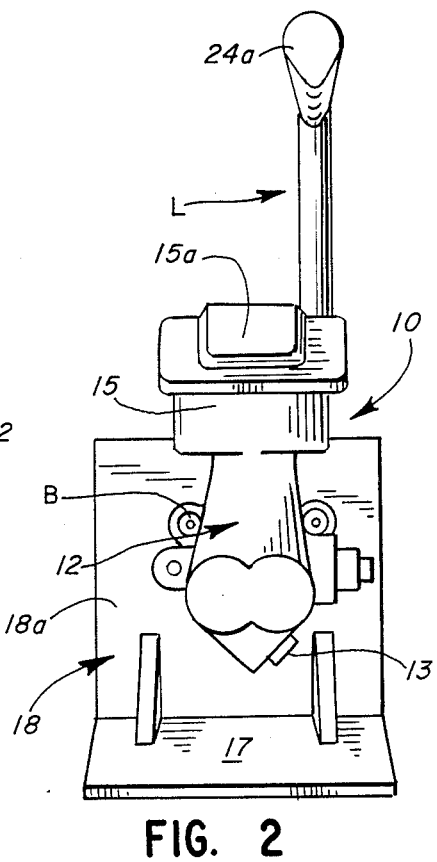
FIG. 2 is a right side elevational view of FIG. 1.
Figure 3:
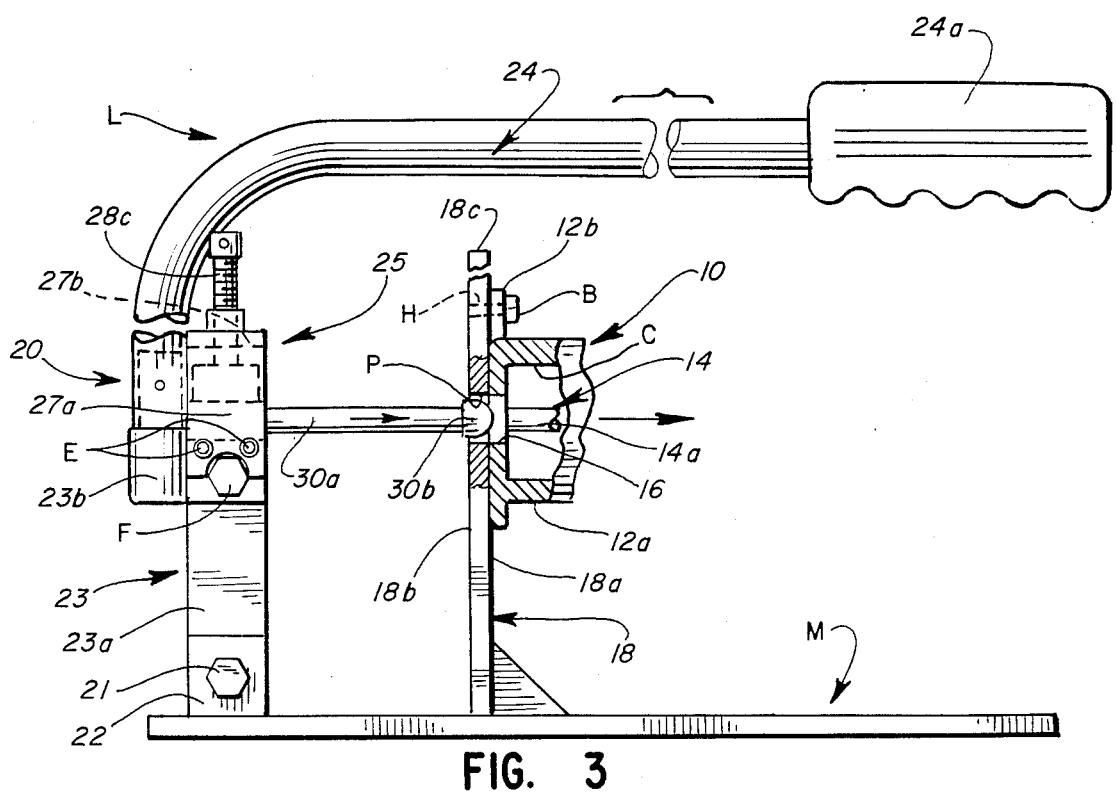
FIG. 3 is an enlarged, fragmentary, side elevational view of the device shown in FIG. 1 with a portion of the cylinder assembly in vertical section.

Referring now to the drawings and more particularly to FIGS. 1-3, a conventional master brake cylinder assembly 10 of the type utilized on automobiles and trucks is shown removed from the vehicle, not shown, and mounted on the improved device 11. The basic components of the assembly 10 are a housing 12 having an interior cylinder C formed therein; an outlet port 13 communicating with the cylinder; a primary piston 14 mounted for reciprocatory movement within the cylinder; and a brake fluid reservoir 15 which communicates with the cylinder. Prior to the assembly 10 being purged of gas by the device 11, the outlet 13 and any other outlet is plugged. The reservoir 15, as illustrated, is provided with a removable cover 15a to allow the reservoir to be replenished with brake fluid when required. One end 12a of the cylinder housing is provided with an external mounting flange 12b and an access opening 16 through which an end portion 14a of the primary piston 14 is accessible. The opposite end portion of piston 14 is provided with a head, not shown, which slidably and sealingly engages the cylinder wall.

Figure 5:
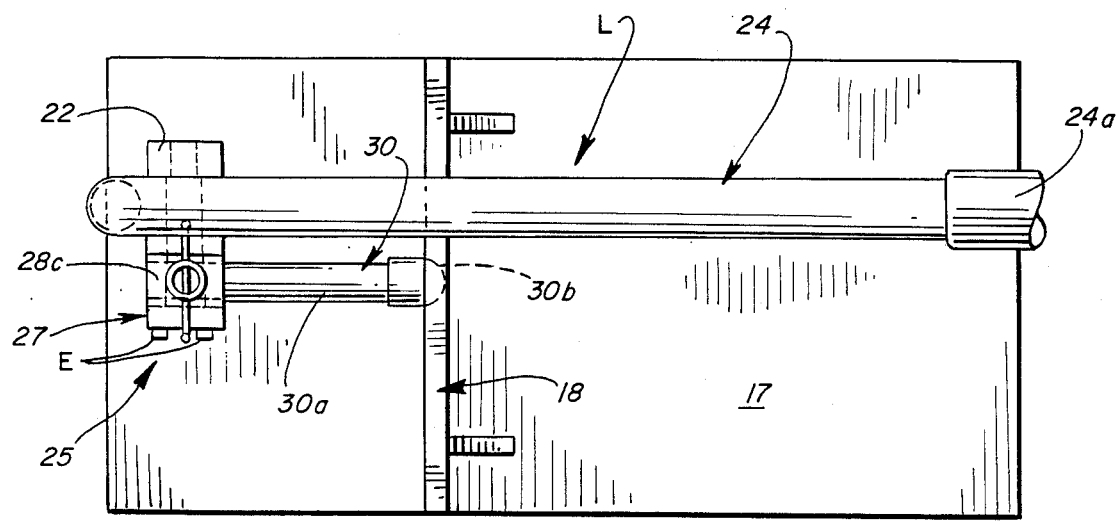
FIGS. 4 and 5 are a left side elevational view and a top view, respectively, of the device per se shown in FIG. 3.
Figure 4:
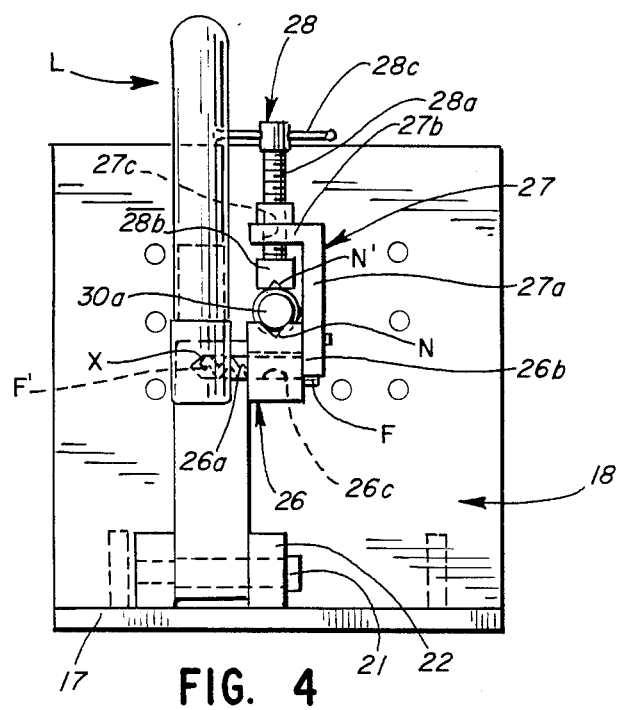

Device 11, as seen more clearly in FIGS. 3-5, includes a support member M having a horizontally disposed base section 17 which rests upon and is supported by a suitable counter or table surface, not shown. Affixed to and extending upright from the base section 17 is a plate section 18 which is provided with a transversely extending passage P. Disposed about passage P are suitable bolt holes H for accommodating a plurality of bolts B or suitable fasteners for removably mounting the cylinder assembly 10 on one surface 18a of the plate section 18.

Located on the opposite side of plate section 18 and spaced from a second surface 18b of plate section 18 is an actuating mechanism 20. The mechanism, as illustrated, includes a lever L which is pivotally connected at 21 to a bracket 22 affixed to base section 17. The lever has a substantially L-configuration with one leg 23 thereof having a first segment 23a pivotally connected to bracket 22 and a second segment 23b connected to and slightly offset with respect to the upper end portion of the first segment. The lever L is provided with a second leg 24 which is disposed at substantially a right angle with respect to leg 23 and is spaced a substantial distance above the upper edge 18c of plate section 18. Leg 24 terminates in an elongated handle 24a, the latter being disposed a substantial distance above the master brake cylinder assembly 10 when it is attached to surface 18a of plate section 18, as will be described more fully hereinafter.

Laterally offset, but attached by a suitable screw fastener F to one side of the upper end portion of leg segment 23a is a clamping assembly 25. The clamping assembly, as seen in FIG. 4, includes a jaw block 26 having a V-shaped notch N formed in an upper surface thereof. Block 26 also has a pair of substantially flat parallel side surfaces 26a, 26b. The surfaces are interconnected by a transversely extending bore 26c which is adapted to accommodate the shank of a fastener F. The inner end F' of the fastener is threaded into a suitable internally threaded opening X formed in the upper end portion of leg segment 23a. Secured to block surface 26a by suitable screw fasteners E (see FIG. 3), is one leg 27a of an inverted L bracket 27. The second leg 27b of bracket 27 is disposed in vertically spaced, transverse relation with respect to the V-notch N formed in block 26. Leg 27b is provided with a transverse internally threaded opening 27c which is adapted to accommodate the threaded shank 28a of an adjustable jaw 28. The lower end of shank 28a has connected thereto a jaw piece 28b which is disposed in spaced aligned relation with the notched upper surface of block 26. The surface of piece 28b adjacent block 26 is provided with a complemental notch N'. The turning of shank 28a to effect movement of jaw piece 28b towards or away from the notched surface of block 26 is facilitated by an elongated cross pin 28c connected to the upper end of the shank, see FIG. 4.

Also comprising a component of actuating mechanism 20 is an enlongated push member 30 which extends transversely from clamping assembly 25 towards plate section 18. Member 30 includes a shank portion 30a having one end portion thereof clamped between jaw block 26 and jaw piece 28b. The shank end portion is centered within the V-shaped notches N and N' of the block and piece. The opposite end portion of shank portion 30a has affixed thereto an enlarged head 30b with a semi-spherical end face. The head 30b is sized so that it can readily pass through passage P of plate section 18 and the access opening 16 of the cylinder housing 12 and engage the end portion 14a of the primary piston 14 when the handle 24a of lever L is pushed downwardly towards the cylinder assembly mounted on plate section 18. In order to effect proper self alignment of the push member 30 with the passage P and access opening 16, the jaw block 26 may be rotated a small amount relative to leg segment 23a about fastener F.

The extent to which head 30b will extend through access opening 16 will depend upon (a) where the clamping assembly 25 engages the shank of the push member 30 and (b) how far the lever L is pivoted in a clockwise direction about pin 21. When the actuating mechanism 20 is in the inoperative mode, see FIG. 3, the head 30b of push member 30 substantially terminates at surface 18a of plate section 18.

It will be noted that the push member 30 is shown disposed on the same side of pivot pin 21 as handle 24a whereby the moment arm of the latter is substantially greater than that of the push member; thus, the pushing force exerted on the end portion of the primary piston by the push member will be substantially greater for a given amount of downward pushing force exerted on the lever handle 24a.

In some instances, not shown, it might be desirable for the handle 24a and the push member to be disposed on opposite sides of the pivot pin 21. In such an arrangement, the bracket 22 would extend upwardly from the base section 17 a substantial amount so that the pivot pin 21 is located at a greater elevation relative to the base section than the centerline of the passage P in plate section 18. The difference in elevation would constitute the moment arm of the push member. Thus, in the modified arrangement to effect a pushing engagement between the push member and the end portion of the primary piston would require a pulling force to be applied to the handle causing the lever to pivot in a counter-clockwise direction.

The shape, size and arrangement of the various components may vary from that shown without departing from the scope of the invention. The improved device is of simple, sturdy construction, easy to operate and is effective in purging entrapped gas from a master brake cylinder.

We claim:

1. A device for bleeding a vehicle master brake cylinder assembly when the latter is removed from the vehicle, the removed assembly having a cylinder with plugged outlet means, a reciprocating primary piston disposed within the cylinder, and having a first end segment of the piston being accessible through an axial access opening formed in an end of the cylinder and a second end segment of the piston disposed within the cylinder and provided with a head, and a fluid reservoir in communication with the cylinder; said device comprising support means mountable on a subtending supporting surface and having a stationary upright plate section provided with a transversely extending passage, one side surface of said upright plate section being adapted to have removably mounted thereon the assembly cylinder with the access opening thereof aligned with and adjacent to the upright plate section passage; and actuating means disposed on an opposite side of the upright plate section and mounted on said support means for selective adjustment between operative and inoperative modes, said actuating means including an elongated push member having an end portion thereof independent of the piston first end segment and aligned with and extending through the upright plate section passage and adapted to effect only pushing engagement with the primary piston first end segment when the actuating means is in the operative mode, and manually operated first means operatively connected to and spaced from said push member for effecting pushing engagement thereof with the primary piston first end segment and bleeding into the reservoir of any gas entrapped within the cylinder ahead of the piston head.

2. The device of claim 1 wherein said actuating means includes second means for effecting independent longitudinal preadjustment of the push member relative to the upright plate section passage while said actuating means is in an inoperative mode.

3. The device of claim 2 wherein the push member includes a shank portion with one end thereof in alignment with and insertable through the upright section passage; the pre-adjusting means including elements in clamping engagement with a segment of the shank spaced from the one end thereof; said elements and the push member moving as a unit when said actuating means is adjusted to the operative mode.

4. The device of claim 1 wherein the manually operated means of the actuating means includes a pivotally mounted lever having a first segment thereof operatively connected to the push member and effecting movement thereof into pushing engagement with the primary piston first end segment when said lever is manually pivoted in one direction.

5. The device of claim 4 wherein the lever first segment has a moment arm relative to the lever pivot axis which is substantially shorter than a moment arm of a second segment of the lever which is adapted to be manually engaged.

6. The device of claim 5 wherein the lever first segment is disposed intermediate the lever pivot axis and the lever second segment.

7. The device of claim 4 wherein the support means includes a horizontally extending base section affixed to and subtending the upright plate section; the lever having a substantial L-configuration formed by interconnected angularly disposed leg portions, one leg portion being pivotally connected to said base section, said pivotal connection being spaced from a second side surface of said upright plate section opposite the said one side surface thereof.

* * * * *